3,280,223
POLYFLUOROALKOXY PHENYLAMINO
PHOSPHONITRILES
Ehrenfried H. Kober, Hamden, Henry F. Lederle, North
Haven, and Gerhard F. Ottmann, Hamden, Conn., assignors to Olin Mathieson Chemical Corporation, a corporation of Virginia
No Drawing. Filed Nov. 15, 1965, Ser. No. 507,719
13 Claims. (Cl. 260—927)

This invention relates to novel cyclic polymeric phosphonitrilic compounds, their preparation and their use as non-flammable, hydrolytically-stable hydraulic fluids, lubricants, and additives. More particularly, this invention relates to cyclic polymeric arylamino polyfluoroalkoxy phosphonitriles and their preparation.

The novel cyclic polymeric arylamino polyfluoroalkoxy phosphonitriles of this invention have the formula:

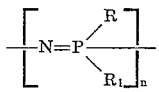

wherein $n$ is an integer of from 3 to 7, and the R and $R_1$ substituents of each unit of the formula:

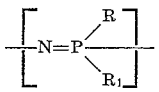

are independently selected from the group consisting of (A):

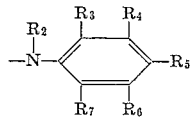

wherein $R_2$ is hydrogen or alkyl, $R_3$, $R_4$, $R_5$, $R_6$ and $R_7$ are hydrogen, alkyl, alkoxy, aryl, aryloxy, halogen, halogenated alkyl or halogenated aryl, and (B):

$$-O-CH_2(CF_2)_yZ$$

wherein Z is fluorine or hydrogen and $y$ is an integer of from 1 to 20 and with the proviso that in the polymeric phosphonitrile at least one of the R and $R_1$ substituents is A and at least one of R and $R_1$ substituents is B.

Polyfluoroalkoxy-substituted phosphonitriles have been available previously for use as hydraulic fluids, lubricants, and the like. Less favorable properties of some of the polyfluoroalkyl-substituted phosphonitrilates include their high pour point, low boiling point and thus high volatility and relatively narrow liquid range, high density, and relatively low spontaneous ignition temperature. Polymeric phosphonitriles which are substituted only with arylamino groups have relatively high melting points and thus are not suitable for use as lubricants and hydraulic fluids.

It has now been discovered that valuable cyclic polymeric arylamino polyfluoroalkoxy phosphonitriles can be prepared by reacting a polymeric cyclic phosphonitrilic halide with an aromatic amine and a polyfluoroalcohol in the presence of a base to effect substantially complete substitution of the halide atoms by the arylamino and polyfluoroalkoxy moieties, and recovering the resulting arylamino-polyfluoroalkoxy-substituted phosphonitriles.

The cyclic polymeric phosphonitrilic halides suitable for use as a reactant in this invention are represented by the formula:

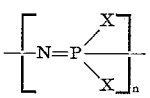

where X is a halide, such as chlorine, fluorine, or bromine, and preferably chlorine or fluorine, and $n$ is a whole number of at least three and up to about seven or higher. The cyclic structure is formed by alternating P and N atoms. Preferably, the trimeric or tetrameric phosphonitrilic halides are employed. The trimeric and tetrameric forms of phosphonitrilic halides are represented by the following cyclic structures:

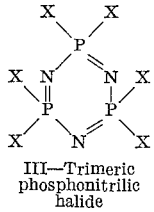 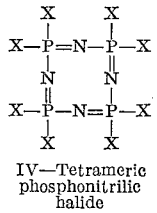

III—Trimeric  IV—Tetrameric
phosphonitrilic  phosphonitrilic
halide  halide

In Formulae III and IV, X has the meaning defined above.

Any aromatic amine capable of substituting halide of a cyclic phosphonitrilic halide under the reaction conditions employed in this invention may be utilized as a reactant. Aromatic amines suitable for use as a reactant in the process of this invention include:

(A) Primary aromatic amines such as:

Aniline
Naphthylamine (B) Aryloxy-substituted primary aromatic amines such as the various isomeric forms of:

Phenoxyanilines (C) Alkoxy-substituted primary aromatic amines such as the various isomeric forms of:

Mono-, di-, or trimethoxyanilines
Mono-, di-, or triethoxyanilines
Mono-, di-, or tripropoxyanilines
Mono-, di-, or tributoxyanilines
Mono-, di-, or tripentoxyanilines
Dimethyl-butoxyanilines
Dimethyl-pentoxyanilines
Dimethyl-hexoxyanilines (D) Alkyl-substituted primary aromatic amines such as the various isomeric forms of:

Methylanilines
Ethylanilines
Dibutylanilines
Tertiary butylanilines
Octylanilines
Dimethylanilines
Dioctylanilines (E) Aryl-substituted primary aromatic amines such as the various isomeric forms of:

Phenylanilines
Methylphenylanilines
Propylphenylanilines
Octylphenylanilines (F) Halogen-substituted primary aromatic amines such as the various isomeric forms of:

Mono-, di-, tri-, tetra-, or pentachloroanilines
Mono-, di-, tri-, tetra-, or pentabromoanilines
Mono-, di-, tri-, tetra-, or pentafluoroanilines (G) Halogenated - alkyl - substituted primary aromatic amines such as the various forms of:

Mono-, di-, or trichloromethylanilines
Mono-, di-, or tribromomethylanilines
Mono-, di-, or trifluoromethylanilines
Bis(mono-, di-, or trichloromethyl)anilines
Bis(mono-, di-, or tribromomethyl)anilines
Bis(mono-, di-, or trifluoromethyl)anilines (H) Halogenated-alkoxy-substituted primary aromatic amines such as the various isomeric forms of:

Mono-, di-, or trichloromethoxyanilines
Mono-, di-, or trifluoromethoxyanilines
Trifluoroethoxyanilines
Octafluoropentoxyanilines
Bis(mono-, di-, or trifluoromethoxy)anilines (I) The N-alkyl substituted aromatic amines cited under A through H above wherein the N-alkyl group includes N-methyl, N-ethyl, N-propyl, N-heptyl, N-isopropyl, N-tert. butyl, N-2-ethylhexyl.

(J) Mixtures thereof and the like.

Alkyls employed as substituents in the aromatic amines of the type mentioned above generally have between 1 and about 12 carbon atoms and preferably between about 1 and about 10 carbon atoms in the alkyl substituents. However, larger numbers of carbon atoms in the alkyl substituents may be employed if desired.

Polyfluoro alcohols suitable for use in the instant invention have the following formula:

$$Z(CF_2)_yCH_2OH$$

where $y$ is a number from 1 to 20, and preferably from 1 to 8, and Z is hydrogen or fluorine. Typical examples of suitable polyfluoro alcohols include 1,1,3-tri H-tetrafluoropropyl alcohol, 1,1,5-tri H-octafluoropentyl alcohol, 1,1,7-tri H-dodecafluoroheptyl alcohol, 1,1-di H-trifluoroethyl alcohol, 1,1-di H-heptafluorobutyl alcohol, 1,1-di H-pentadecafluorooctyl alcohol, etc., as well as mixtures thereof, and the like.

The base employed in the reaction can be any alkaline compound capable of acting as an acceptor for the hydrogen halide produced in the reaction. However, for the replacement of halogen by an aromatic amino group, either the respective aromatic amine or a tertiary amine such as triethylamine, for example, or N,N-dimethylaniline is preferably used as a hydrogen chloride acceptor, but an alkali metal hydroxide such as potassium hydroxide or sodium hydroxide, and alkaline earth metal hydroxides such as calcium hydroxide, and the like may also be employed. Sodium hydride might also be utilized when reacting the fluorinated alcohols with the phosphonitrilic chlorides, especially when low boiling fluorinated alcohols such as trifluoroethanol or heptafluorobutanol are used. In these cases, the sodium salt of the fluorinated alcohol is formed first. In the second step, the sodium salt of the fluorinated alcohol and the aromatic amine, in the presence of an excess of the respective aromatic amine or in the presence of a tertiary amine or the alkaline hydroxide, are then reacted with the phosphonitrilic halide to effect complete substitution of all halide atoms attached to the phosphonitrilic moiety by fluoroalkoxy and arylamino groups.

The hydrogen halide acceptor is employed in an amount sufficient to provide at least the stoichiometric proportion to form the corresponding halide and amine hydrohalide with all of the halide atoms attached to the phosphonitrilic moiety, but preferably between about 1.2 and about 1.5 times the stoichiometric proportion of hydrogen halide acceptor is employed.

The reaction may be carried out in an inert solvent capable of dissolving the phosphonitrilic halide. Suitable solvents include benzene, toluene, xylene, chlorobenzene, mixtures thereof and the like.

The total number of moles of aromatic amine and polyfluoro alcohol employed per monomeric unit

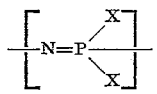

in the phosphonitrilic halide is equivalent to a molar ratio of between about 2:1 and about 4:1, and preferably between about 2:1 and about 2.5:1. If a molar ratio of less than about 2:1 is employed, complete substitution of the halide atoms of the phosphonitrilic halide is not affected. Molar ratios of greater than about 4:1 may be employed, but no significant improvement in yield is effected by the use of amounts of the aromatic amine and/or polyfluoro alcohol in excess of this ratio.

The amount of the aromatic amine employed as a reactant in the process of this invention is equivalent to at least 1 mole of the aromatic amine per mole of cyclic phosphonitrilic halide employed. In addition, the amount of polyfluoro alcohol employed as a reactant is equivalent to at least 1 mole of the alcohol per mole of cyclic phosphonitrilic halide. Thus, when stoichiometric proportions are employed, for each mole of tetrameric phosphonitrilic halide reacted, there is reacted between 1 mole and 7 moles of the aromatic amine, and between 7 moles and 1 mole of the polyfluoro alcohol, the total moles of aromatic amine and alcohol being 8 moles.

In carrying out the process of this invention, the phosphonitrilic halide may be added to a solution of the aromatic amine and the hydrogen halide acceptor in a suitable solvent of the type described above. The polyfluoro alcohol and additional alkaline compound are added to substitute the remaining unreacted halide atoms on the phosphonitrilic halide ring.

The order of addition of the reactants is not critical with respect to the completeness of the substitution. Thus, either the aromatic amine or the polyfluoroalcohol may be first reacted with the phosphonitrilic halide, or both of the compounds may be reacted simultaneously with the phosphonitrilic halide to effect complete substitution. However, the order of addition does affect the composition and physical properties of the final product and the ratio of arylamino to polyfluoroalkoxy-substitution.

The reaction is performed at temperatures in the range between about 75° and 180° C., and preferably in the range between about 100° and about 150° C. The reaction time will vary with the reactants employed and the temperature employed, but complete reaction can generally be obtained in between about 2 and about 72 hours. Pressure conditions during the reaction are not critical. Generally, atmospheric pressure is employed, but higher or lower pressures may be employed if desired.

The reaction of the cyclic phosphonitrilic halide with both the aromatic amine and polyfluoro alcohol is represented by the following formula:

$$N_nP_nX_{2n} + aR'H + bR''H \rightarrow N_nP_nR'_aR''_b + 2nHX$$

where $n$ is a whole number between 3 and 7, where $a+b=2n$, where $a$ has the value of between 1 and $(2n-1)$, where $b$ has the value of between 1 and $(2n-1)$, where R' is a polyfluoroalkoxy group of the generic formula $$Z(CH_2)_yCH_2O—$$

in which $y$ is a whole number from 1 to 20 and preferably 1 to 8, and Z is hydrogen or fluorine, and where R'' is an arylamino group selected from the group consisting of anilino, naphthylamino, aryloxy-substituted anilino, alkoxy-substituted anilino, alkyl-substituted anilino, aryl-substituted anilino, halogen-substituted anilino, halogenated alkyl-substituted anilino, halogenated alkoxy-substituted anilino, or an N-alkyl arylamino group selected from the group consisting of N-alkylanilino, N-alkyl naphthylamino, N-alkyl aryloxy-substituted anilino, N-alkyl alkoxy-substituted anilino, N-alkyl alkyl-substituted anilino, N-alkyl aryl-substituted anilino, N-alkyl halogen-substituted anilino, N-alkyl halogenated alkyl-substituted anilino, N-alkyl halogenated alkoxy-substituted anilino, and mixtures thereof. Typical examples of suitable arylamino groups are those derived from the previously illustrated aromatic amine reactant.

Thus, to illustrate the product obtained when cyclic trimeric phosphonitrilic halide of Formula III is reacted with 4 moles of a polyfluoro alcohol (R'H) and 2 moles of an aromatic amine (R″H), the novel product is represented by the following formula:

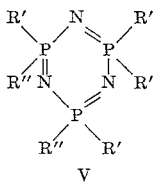

and/or isomers thereof.

The compounds of this invention are fire-resistant, have low pour points, high boiling points and thus low volatilities and relatively wide liquid range. The density of these materials is relatively low, which makes them suitable for present engine designs. In addition, the spontaneous ignition temperature of these compounds is high, and they are characterized by excellent hydrolytic stability and possess outstanding lubricity characteristics. In addition, when added to conventional lubricants, such as tricresyl phosphate, mineral oil, etc., they improve the lubricity thereof.

The following examples are presented to further illustrate the invention without any intention of being limited thereby. All parts and percentages are by weight unless otherwise specified.

The following abbreviations have been used throughout the examples:

(1) B.P.=boiling point.
(2) K. Vis.$_{100}$=kinematic viscosity in centistokes at 100° F.
(3) K. Vis.$_{210}$=kinematic viscosity in centistokes at 210° F.
(4) ASTM slope=slope obtained in accordance with ASTM designation number D341–43, "Standard viscosity-temperature charts for liquid petroleum products."
(5) mm.=millimeters of mercury.
(6) density=grams/cc. at 25° C.

Nuclear magnetic resonance was used to determine in each example the ratio of fluoroalkoxy to arylamino moieties in the products, and was supplemented by Kjeldahl nitrogen analysis. The potassium hydroxide, when employed in the examples, was considered to be 90 percent pure. Thus, the weight presented for potassium hydroxide is the weight of the reagent employed, but the moles recited are the moles of pure KOH present in the reagent.

All spontaneous ignition temperatures were obtained by dropping a few drops of the product into a porcelain crucible heated by means of an electric furnace, the ignition temperature being obtained by means of a thermocouple.

EXAMPLE I

*Trimeric N-methylanilino-2,2,2-trifluoroethoxy phosphonitriles*

A three-liter three-neck flask, equipped with stirrer, condenser and thermometer, was charged with 86.8 g. (0.25 mole) of trimeric phosphonitrilic chloride and 1000 ml. of toluene. Heating and stirring were started. When about 80° C. was reached, a mixture of 80.4 g. (0.75 mole) of N-methylaniline and 76 g. (0.75 mole) of triethylamine was added via a dropping funnel during a period of about 40 minutes. The mixture was then stirred and refluxed for a total of forty hours, after which triethylamine hydrochloride (59.4 percent of the theory) was filtered from the cooled solution. After washing with cold water and drying over sodium sulfate, the product was concentrated to about 450 ml.

The fluoroalkoxide was prepared in a separate 5 liter three neck flask. To a 53.3 percent suspension of 56.4 g. (1.25 moles) sodium hydride in mineral oil, washed with seven 200 ml. portions of ether, was added 125 g. (1.25 moles) of trifluoroethanol, dissolved in 125 ml. of dry ether, at such a rate that gentle spontaneous refluxing resulted. A total of 700 ml. of toluene was then added and the ether was removed by distillation. The 450 ml. of the concentrate containing the chloroamino intermediate was then added to the warm solution via a dropping funnel and the reaction mixture was stirred and refluxed for eighteen hours. After washing the cooled product with water, the solvent was stripped by heating to 170° C. bottoms at atmospheric pressure, followed by 190° C. bottoms at 10–20 mm. (water aspirator), and finally 150° C. bottoms at 1 mm. or less overnight. The product was filtered and then fractionated in high vacuo through a heated Vigreaux column to give—after a low boiling forerun the following fractions:

(1) B.P. 140–170° C./0.88 mm.; $n_D^{25}$=1.4238; 22.2 percent yield; density=1.45; K.Vis.$_{100}$=26.9 cs.; K.Vis.$_{210}$=3.69 cs.; ASTM slope=0.82; pour point=−20° F.; spontaneous ignition temperature=940° F.

(2) B.P. 170–203° C./0.08–0.2 mm.; $n_D^{25}$=1.4572; 22.0 percent yield; density 1.41; K.Vis.$_{100}$=60.7 cs.; K.Vis.$_{210}$=5.79 cs.; ASTM slope=0.88; pour point=0° F.; spontaneous ignition temperature=900° F.

(3) 203–227° C./0.2–2.0; $n_D^{25}$=1.4850; 14.7 percent yield; density 1.36; K.Vis.$_{100}$° F.=115.7 cs.; K.Vis.$_{210}$° F.=8.56 cs.; ASTM slope—0.84; pour point not determined; spontaneous ignition temperature=800° F.

Based on data obtained by nuclear magnetic resonance spectroscopy it was determined that the first fraction contained 1.33 moles of N-methylanilino groups, the remaining 4.67 moles being trifluoroethoxy groups and that fraction 2 contained 2.08 moles of N-methylanilino groups, 3.92 moles of trifluoroethoxy groups. Nitrogen analysis confirmed to values found for the ratio of N-methylanilino groups to trifluoroethoxy groups: Fraction 1: N calcd.: 8.17 percent; found: 8.25 percent; fraction 2: N calcd.: 9.58 percent, found: 9.28 percent.

EXAMPLE II

*Trimetric N-methylanilino-2,2,3,3,4,4,5,5-octafluoropentoxy phosphonitrile*

A 3-liter three-neck flask equipped with a dropping funnel, stirrer and azetotrope trap and condenser was charged with 0.25 mole (86.8 g.) of trimeric phosphonitrilic chloride, 0.75 mole of N-methylanilines (80.4 g.) and 800 ml. of toluene. While refluxed and stirred, 0.75 mole of potassium hydroxide 46.8 g. (calculated as 90 percent) was added in small portions through the condenser during a period of 15 minutes. Refluxing and stirring were continued for 24 hours, a total of 9.5 ml. of water being azeotroped during this time. On cooling, the product was filtered, which removed minor amounts of hydrochloride.

The remainder of the procedure is identical with Example 1, except that 1.25 moles of octafluoropentanol, 290.0 g. were used in place of trifluoroethanol.

The main cut, obtained by fractional distillation, amounted to a yield of 57.4 percent and had the following properties: B.P. 203–225° C./0.2 mm.; $n_D$1.3856; density=1.66; K.Vis.$_{100}$° F.=163.5 cs.; K.Vis.$_{210}$° F.=8.56 cs.; ASTM slope=0.76; pour point=−20° F.; spontaneous ignition temperature=980° F. Based on data obtained by nuclear magnetic resonance spectroscopy it was determined that this product contained 1.14 moles of N-methylanilino groups, the remaining 4.86 moles being 2,2,3,3,4,4,5,5-octafluoropentoxy groups; this ratio was confirmed by nitrogen analysis; N calcd. 4.21 percent, found: 4.15 percent.

EXAMPLE III

*2,2-bis(N-methylanilino)-4,4,6,6,8,8-hexakis(2,2,2-trifluoroethoxy)tetraphosphonitrile*

2,2 - bis(N-methylanilino)-4,4,6,6,8,8-hexachloro tetraphosphonitrile was prepared by the method of K. John and coworkers (J. Am. Chem. Soc. 82 5616 (1960)).

To a 1-liter three-neck flask containing 0.375 mole of a 53.3 percent suspension of sodium hydride in mineral oil (washed seven times with ether to remove the hydrocarbon) was added 125 ml. of dry ether. While the slurry was stirred, a solution of 2,2,2-trifluoroethanol, 0.375 mole, 37.5 g. in 40 ml. of ether was added slowly via a dropping funnel. The ether was replaced by toluene to 100° C. bottoms, and then a solution of bis(N-methylanilino)-hexachloro tetraphosphonitrile in 150 ml. of toluene (0.05 mole, 30.25 g.) was added slowly to the warm fluoroalkoxide via a dropping funnel. After stirring and refluxing for eighteen hours, the product was worked up as described in Example I.

The product obtained in 91.7 percent overall yield, had the following physical properties: Boiling point, 153–164° C/0.03–0.05 mm., refractive index of 1.4331, density 1.47, viscosity 100.4 cs. at 100° F. and 10.2 cs. at 210° F., ASTM slope of 0.73, pour point of 0° F., and spontaneous ignition temperature of 850° F. Based on nuclear magnetic resonance spectroscopy data it was determined that this product contained 2.01 moles of N-methyl anilino groups, the remaining 5.99 moles being trifluoroethoxy groups; analysis for nitrogen supported this ratio: N calcd. 8.59 percent, found: 8.75 percent. The product was substantially pure 2,2-bis(N-methylanilino)-4,4,6,6,8,8,-hexakis(2,2,2 - trifluoroethoxy)tetraphosphonitrile having the formula:

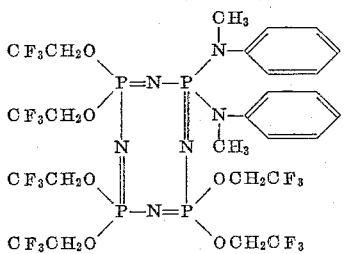

EXAMPLE IV

*2,2-bis(N-methylanilino)-4,4,6,6,8,8-hexakis(2,2,3,3,4,4-5,5-octafluoropentoxy)tetraphosphonitrile*

The procedure described in Example III was repeated except that 2,2,3,3,4,4,5,5-octafluoropentanol, instead of trifluoroethanol, was used. The following amounts of reactants were charged: Sodium hydride (53.3 percent) 0.225 mole, 10.1 g.; octafluoropentanol 0.225 mole, 52.2 g., and bis(N-methylanilino)-hexachloro tetraphosphonitrile, 0.03 mole, 18.2 g. (prepared by the method of K. John and coworkers).

The main distillation fraction, obtained in 71.9 percent overall yield, boiled at 237–257° C./0.1 to 0.2 mm., and it had the following physical properties: $n_D^{25} = 1.4000$; density=1.63; K.Vis.$_{100°}$ F.=454.5 cs., K.Vis.$_{210°}$ F.= 28.3 cs.; ASTM slope=0.66; pour point=0° F.; spontaneous ignition temperature=1025° F. Based on nuclear magnetic resonance spectroscopy data, this product was shown to contain 2.01 moles of N-methylanilino groups, the remaining 5.99 moles being 2,2,3,3,4,4,5,5-octafluoropentoxy groups; this ratio was confirmed by nitrogen analysis: N. calcd.; 4.76 percent, found: 4.38 percent. The product was substantially pure, 2,2-bis-(N - methylanilino) - 4,4,6,6,8,8 - hexakis(2,2,3,3,4,4,5,5-octafluoropentoxy)tetraphosphonitrile having the formula:

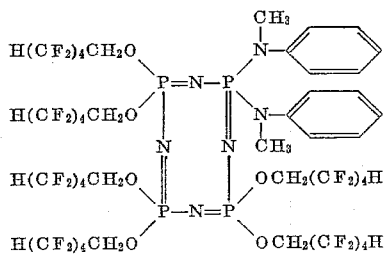

EXAMPLE V

*Trimeric N-methyl-m-chloroanilino-trifluoroethoxy phosphonitrile*

The procedure described in Example I was repeated, using the following quantities: 88.1 g., (0.625 mole) N-methyl-m-chloroaniline; 63 g. (0.625 mole) triethylamine; 69.5 g. (0.2 mole) trimeric phosphonitrilic chloride; 58.5 g. (1.30 moles) sodium hydride; 130 g. (1.30 moles) trifluoroethanol. The main products from the distillation, fractions 2 and 3, had the following properties:

(2) B.P. 147–182° C./0.3 mm., yield=18.8 percent; $n_D^{25}$=1.4235; density=1.51; K.Vis.$_{100°}$ F.=24.3 cs.; K.Vis.$_{210°}$ F.=3.69; ASTM slope=0.88; pour point= −30° F.; spontaneous ignition temperature=925° F.

(3) B.P. 182–190° C./0.3–0.7 mm.; yield=18.1 percent; $n_D^{25}$=1.4760; density=1.45; K.Vis.$_{100°}$ F.=61.5 cs.; K.Vis.$_{210°}$ F.=5.72 cs.; ASTM slope=0.89; pour point= 0° F.; spontaneous ignition temperature=925° F.

Based on nuclear magnetic resonance spectroscopy data, fraction 2 contained 1.08 moles and fraction 3 contained 1.65 moles of N-methylanilino-m-chloroanilino groups; the remaining 4.92 moles and 4.35 moles, respectively, being trifluoroethoxy groups; nitrogen analysis confirmed this ratio; fraction 2: N. calcd.: 7.40 percent, found: 7.44 percent; fraction 3; N. calcd.: 8.18 percent, found: 8.58 percent.

EXAMPLE VI

*Trimeric anilino-2,2,2-trifluoroethoxy phosphonitrile*

The procedure described in Example I was repeated with 0.75 mole of aniline instead of with 0.75 mole of N-methylamine.

Fractional distillation gave the following major fraction: B.P.=187–193° C./0.1–0.3 mm.; yield=30.2 percent; spontaneous ignition temperature=1175° F.

EXAMPLE VII

*Trimeric anilino-2,2,3,3-tetrafluoropropoxy phosphonitrile*

The procedure described for Example I was repeated with aniline instead of N-methylaniline and with 2,2,3,3-tetrafluoropropanol instead of trifluoroethanol. The following amounts of reactants were charged: 62.1 g. (0.667 mole) aniline; 67.5 g. (0.667 mole) triethylamine; 115.9 g. (0.33 mole) phosphonitrilic chloride trimer; 75.0 g. (1.665 moles) sodium hydride 53.3 percent; 220 g. (1.665 moles) tetrafluoropropanol.

Fractional distillation gave—after a small forerun— the following fractions:

(1) B.P. 174–209° C./0.1–0.2 mm.; 17.3 percent overall, semisolid.

(2) B.P. 209–214° C./0.2–0.7 mm.; 12.4 percent overall, semisolid.

(3) B.P.=165–203° C./0.7–1.2 mm.; yield=8.6 percent, $n_D^{25}$=1.4440; density=1.50; K.Vis.$_{100°}$ F.=193.5 cs.; K.Vis.$_{210°}$ F.=11.20 cs.; ASTM slope=0.84; spontaneous ignition temperature=1140° F. Based on nuclear magnetic resonance spectroscopy, this product contained 1.75 moles of anilino groups, the remaining 4.25 moles being 2,2,3,3-tetrafluoropropoxy groups.

Fractions 1 and 2 were combined and a small amount of solids was removed by filtration to give a product of the following properties: $n_D^{25}$=1.4504; density=1.45; K.Vis.$_{100°}$ F.=120.5 cs.; K.Vis.$_{210°}$ F.=8.00 cs.; ASTM slope= 0.88; pour point=0° F.; spontaneous ignition temperature=1160° F. Based on nuclear magnetic resonance spectroscopy data this product contained 2.09 moles anilino groups, the remaining 3.9 moles being 2,2,3,3-tetrafluoropropoxy groups.

EXAMPLE VIII

*Trimeric anilino-2,2,3,3,4,4,5,5-octafluoropentoxy phosphonitrile*

The procedure described in Example I was repeated with aniline instead of N-methylaniline and with 2,2,3,3,4,4,5,5-octafluoropentanol instead of trifluoroethanol. The following amounts of reactants were charged: 31.0 g. (0.333 mole) aniline; 33.6 g. (0.333 mole) triethylamine; 55.6 g. (0.167 mole) trimeric phosphonitrilic chloride; 37.6 g. (0.83 mole) sodium hydride 53.3 percent, and 194 g. (0.83 mole) octafluoropentanol.

Fractional distillation gave—after a small forerun—the following fractions:

(1) B.P.=215–236° C./0.4 mm.; yield=30.0 percent; $n_D^{25}$=1.3960; density=1.66; K.Vis.$_{100}$° F.=351.8; K.Vis.$_{210}$° F.=16.60 cs.; ASTM slope=0.79; pour point=+5° F.; spontaneous ignition temperature=1100° F.

(2) B.P.=217–236° C./0.4–3.0 mm.; yield=8.7 percent; $n_D^{25}$=1.4199; density=1.57; K.Vis.$_{100}$° F.=443.2 cs.; K.Vis.$_{210}$° F.=15.83 cs.; ASTM slope=0.85, spontaneous ignition temperature=1140° F.

Based on nuclear magnetic resonance spectroscopy data, fraction 1 contained 1.36 moles and fraction 2 contained 2.01 moles of anilino groups, the remaining 4.64 and 3.99 moles, respectively, being 2,2,3,3,4,4,5,5 - octafluoropentoxy groups. These ratios were confirmed by nitrogen analysis; fraction 2: N calcd.: 4.59 percent, found: 4.37 percent; fraction 3: N calcd.: 5.65 percent, found: 5.45 percent.

EXAMPLE IX

*Trimeric m-methylanilino-2,2,2-trifluoroethoxy phosphonitrile*

The procedure described for Example I was repeated with 0.75 mole of m-methylaniline instead of 0.75 mole of N-methylaniline. Fractional distillation gave the following fractions:

(1) B.P. 113–186° C./0.07–0.08 mm., 5.5 percent, partly solid.

(2) B.P. 186–202° C./0.08–0.1 mm., 21.8 percent, yellow solid.

(3) B.P. 157–191° C./0.1–1.5 mm., 7.6 percent, partly solid.

(1) B.P.=172–201° C./0.2–0.9 mm.; yield=19.8 percent, mostly liquid.

Fractions 1 and 3, combined and filtered, gave the following physical properties: $n_D^{25}$=1.5033; density=1.28; spontaneous ignition=1225° F. Based on nuclear magnetic resonance spectroscopy data, the product contained 3.07 moles of m-methylanilino groups, the remaining 2.93 moles being trifluoroethoxy groups.

Fraction 4: B.P.=157–167° C./1.5–12.0 mm.; yield= 10.1 percent; $n_D^{25}$=1.5657; density=1.16; K.Vis.$_{100}$° F.= 12.3 cs.; K.Vis.$_{210}$° F.=1.99 cs.; ASTM slope=1.07; spontaneous ignition temperature=1275° F.

Based on nuclear magnetic resonance spectroscopy, this product contained 3.49 moles of m-methylanilino groups, the remaining 2.51 moles being trifluoroethoxy groups.

EXAMPLE X

*Trimeric m-chloroanilino-2,2,2-trifluoroethoxy phosphonitrile*

The procedure described for Example I was repeated using 0.75 moles (95.9 g.) of m-chloroaniline instead of N-methylaniline. After a small forerun, fractional distillation gave the following fractions:

(1) B.P.=172–201° C./0.2–0.9 mm.; yield=19.8 percent; $n_D^{25}$=1.5027; density=1.39 spantaneous ignition temperature=1250° F.

(2) B.P.=185° C./0.9 mm. to 157° C./6.0 mm.; yield =11.7 percent; $n_D^{25}$=1.5227; density=1.36; K.Vis.$_{100}$° F. =11.7 cs.; K.Vis.$_{210}$° F.=2.12 cs.; ASTM slope—0.99; spontaneous ignition temperature=1300° F.

Based on nuclear magnetic resonance spectroscopy, this product contained 3.34 moles of m-chloroanilino groups, the remaining 2.66 moles being trifluoroethoxy groups.

*Hydrolytic stability test.*—The compounds of this invention are hydrolytically stable. In order to pass extreme requirements, the removal of traces of impurities is essential and is best done by the following procedure.

The compound is stirred with 2 percent by weight of charcoal at 70° C. for one hour and filtered using filter aid. The charcoal treatment is repeated once more. Materials treated in this fashion pass the hydrolytic stability test according to Military Specification (Ships) MIL-H–19457A by a wide margin.

The hydrolytic stability test is performed in a beverage bottle which contains a 75 g. sample of the fluid, 25 g. of deionized water and a specially prepared copper corrosion specimen and which is rotated in an oven at 93° C. The rotation is carried out "end-over-end" at 5 revolutions per minute. After 48 hours, the acidity of the water and fluid layer are measured, and weight and appearance changes of the copper specimen are noted. For comparison, the most important specifications and the results obtained for the fluid prepared according to Example 3 and purified according to the procedure given above, are listed in the following table:

| Compound | Water Layer mg. KOH Consumed | Test Fluid Acid No. After Test [1] | Copper Specimen | |
|---|---|---|---|---|
| | | | Weight Loss, mg./ sq. cm. | Appearance |
| MIL-H-19457A | 5.0 max. | 0.2 | 0.3 max. | No corrosion brown stain permitted. |
| Compound prepared according to Example 3 | 2.04 | 0.01 | 0.113 | Maroon stain. |

[1] Maximum acid number increase.

*Lubricity test.*—The compound prepared according to the procedure described in Example 3 was tested in the Falex lubricity test. In this procedure, a steel peg of 0.25-inch diameter, immersed in the test fluid, is rotated between two V-shaped bearing blocks, which are pressed against the peg by a loading device, connected to a ratchet wheel. The amount of wear is determined from the number of teeth (notches) the ratchet wheel must be advanced to maintain a desired load. The diameter decrease of the peg is also measured. A low number of notches take-up and a small diameter decrease indicate good lubricity of the fluid tested. Runs were performed with the compound prepared according to Example III using Ucon 50 HB 660 and tricresyl phosphate as reference fluids. In each case, the load was increased in eight hourly increments of 100 lbs. each, after which the total notches take-up and the diameter decreased was observed. The compound prepared according to Example III performed much better than the reference fluids with regard to both notches take-up and diameter decrease. The results are given in the following table.

| Compound | Time, Hours | Max. Load, Pounds | Take-up Notches | Condition | Diameter Decrease, Inches |
|---|---|---|---|---|---|
| Ucon 50 HB 660 [1] | 6.0 | 700 | 129 | Severely worn. | 0.0170 |
| Tricresyl phosphate | 8.0 | 800 | 142 | do | 0.0070 |
| Compound prepared according to Example 3. | 8.0 | 800 | 42 | Scarred | 0.0002 |

[1] Trademark of Union Carbide Company for a 50/50 molar mixture of ethylene oxide and propylene oxide added to butanol until the kinematic viscosity is 660 at 100° F. The molecular weight is 1760.

*Thermal stability.*—In the thermal stability test, about 20 g. of representative samples were heated in a nitrogen atmosphere at 350° C. for four hours. After the test, the viscosities at 100° F. and 210° F., and the ASTM slopes, and the refractive indices were redetermined and compared with the original values. In addition, the weight loss of the sample was obtained.

The product prepared according to Example 3 was subjected to the thermal stability test. Physical property changes observed were as follows: K. Vis.$_{100}$° F. 100.4 cs. before the test and 149.4 cs. after the test; K. Vis.$_{210}$° F. 10.24 cs. before and 11.42 cs. after the test; ASTM slope 0.73 before and 0.81 after the test; refractive index 1.4331 before and 1.4413 after the test; weight loss 0.99 percent.

Various modifications of the invention, some of which have been referred to above, may be employed without departing from the spirit of the invention.

EXAMPLE XI

2,2-bis(anilino)-4,4,6,6-tetrachloro triphosphonitrile

To a stirred solution of 173.8 g. (0.5 mole) of $(PNCl_2)_3$ in 800 ml. of dry toluene was added a mixture of 100.6 g. (1.08 moles) of aniline and 101.2 g. (1.0 mole) of triethylamine over a 40-minute period at a temperature of 80° C. The mixture was then refluxed for 3 hours. After cooling, the precipitate was removed by suction filtration and extracted twice with 240 ml. each of boiling toluene. The toluene solutions were combined and concentrated to one third of its original volume. Upon cooling, the compound 2,2-bis(anilino)-4,4,6,6-tetrachloro triphosphonitrile precipitated in form of white crystals, M.P. 206–208° (68.0 g., 30 percent yield). Recrystallization from petroleum ether (B.P. 65–100°) raised the melting point to 207.5–208.5°.

*Analysis.*—Calcd. for $C_{12}H_{12}Cl_4N_5P_3$: Cl., 30.78; N, 15.18; P, 20.16. Found: Cl., 30.50; N, 15.20; P, 19.54.

Nuclear magnetic resonance spectroscopy confirmed the product to be 2,2-bis(anilino)-4,4,6,6-tetrachloro triphosphonitrile. The $P^{31}$ spectrum showed a doublet of relative intensity 2 at 20.4 p.p.m. indicative of a phosphorus atom bonded to 2 chlorine atoms, and a triplet of unit relative intensity at +2.3 p.p.m. The triplet formation showed a symmetrical arrangement of this phosphorus atom between two of the other type. The assigned structure is in support of a geminal substitution pattern for the replacement of the chlorine atoms of $(PNCl_2)_3$ by aromatic amino groups.

EXAMPLE XII

2,2-bis(anilino)-4,4,6,6-tetrakis(2,2,2-trifluoroethoxy) triphosphonitrile

To a stirred slurry of 36.5 g. of sodium trifluoroethoxide (freshly prepared from trifluoroethanol and sodium hydride in ether) in 300 ml. of dry toluene was added a solution of 30.0 of 2,2-bis(anilino)-4,4,6,6-tetrachloro triphosphonitrile, prepared in Example XI, in 300 ml. of dry toluene over a 30-minute period. The reaction mixture was refluxed for 20 hours and then cooled and extracted several times with water. The dried organic layer was freed from solvent and the residue (51.0 g.) was distilled in vacuo. The fraction distilling between 187° and 193° at 0.1–0.3 mm. solidified upon standing. Recrystallization from petroleum ether (B.P. 65–110°) afforded 19.9 g. (42.7 percent) of 2,2-bis(anilino)-4,4,6,6-tetrakis(2,2,2 - trifluoroethoxy) triphosphonitrile, M.P. 100–101° C., of the formula:

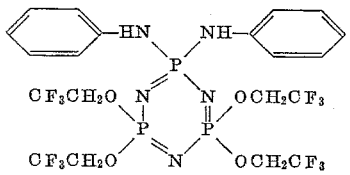

*Analysis.*—Calcd. for $C_{20}H_{20}F_{12}N_5O_4P_3$: C, 33.58; H, 2.82; N, 9.79; P, 12.99. Found: C, 33.89; H, 2.89; N, 10.16; P, 13.04.

EXAMPLE XIII

2,2-bis(anilino)-4,4,6,6-tetrakis(2,2,3,3-tetrafluoropropoxy) triphosphonitrile This compound was prepared from 153.6 g. of 2,2-bis-(anilino)-4,4,6,6-tetrachloro triphosphonitrile and 256.0 g. of sodium 2,2,3,3-tetrafluoropropoxide by the procedure used for the preparation of the product of Example XII. Vacuum distillation of the crude reaction product (224 g., 80 percent yield) was accompanied by extensive polymerization and afforded 64.9 g. of crude 2,2-bis-(anilino) - 4,4,5,5 - tetrakis(2,2,3,3-tetrafluoropropyl) triphosphonitrile, B.P. 209–214°/0.2–0.7 mm., which, after recrystallization from petroleum ether (B.P. 65–110°), melted at 98–100°. The formula of this product is shown below:

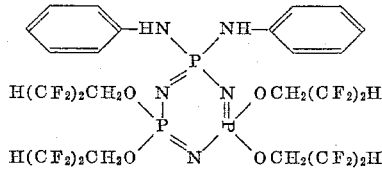

*Analysis.*—Calcd. for $C_{24}H_{24}F_{16}N_5O_4P_3$: C, 34.17; H, 2.87; N, 8.30; P, 11.02. Found: C, 33.88; H, 2.97; N, 8.37; P, 11.35.

EXAMPLE XIV

2,2-bis(m-chloroanilino)-4,4,6,6-tetrakis(trifluoroethoxy) triphosphonitrile To a stirred solution of 86.6 g. (0.25 mole) of $(PNCl_2)_3$ in 1000 ml. of toluene at 80° was added a mixture of 63.8 g. (0.5 mole) of m-chloroaniline and 50.5 g. (0.5 mole) of triethylamine over a period of one hour. The mixture was refluxed for 8 hours and then filtered from 70.0 g. of $(C_2H_5)_3NHCl$. The filtrate was concentrated to a volume of 500 ml. and then added to a vigorously stirred and boiling suspension of 146.6 g. (1.2 moles) of sodium trifluoroethoxide in 750 ml. of toluene. After a reflux period of 20 hours, the mixture was cooled and then extracted several times with water. The organic phase was stripped from the solvent to yield 155.5 g. (79.3 percent) of a crude, oily reaction product which was distilled to give 59.0 g. of product (B.P. 172–185°/0.2–0.9 mm.) Most of the distillate solidified upon standing; liquid contaminants were removed by suction, filtration, and the filter cake was recrystallized from petroleum ether (B.P. 65–100°) to yield 30 g. (15.3 percent) of 2,2-bis(m-chloroanilino)-4,4,6,6-tetrakis(2,2,2-trifluoroethoxy) triphosphonitrile, M.P. 102–104°, having the formula:

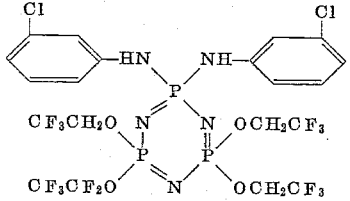

*Analysis.*—Calcd. for $C_{20}H_{18}Cl_2F_{12}N_5O_4P_3$: P, 11.84; N. 8.93; Cl, 9.05. Found: P, 11.61; N, 8.99; Cl. 9.03.

EXAMPLE XV

2,2-bis(m-methylanilino)-4,4,6,6-tetrakis(2,2,2-trifluoroethoxy) triphosphonitrile Amounts of 86.6 g. (0.25 mole) of $(PNCl_2)_3$, 1000 ml. toluene, 53.5 g. (0.5 mole) of m-toluidine, 50.5 g. (0.5 mole) of triethylamine, and 146.6 g. (1.2 moles) of sodium trifluoroethoxide were reacted as described for the preparation of the product of Example XIV to give 140 g. (75.5 percent) of crude reaction product. Vacuum distillation afforded 64.3 g. (34.6 percent yield) of 2,2-bis(m - methylanilino) - 4,4,6,6 - tetrakis(2,2,2-trifluoroethoxy)triphosphonitrile, B.P. 186–191°/0.08–0.1 mm., which, after one recrystallization from petroleum ether (B.P. 65–110°), melted at 102.5–104°. The formula for this product is shown below:

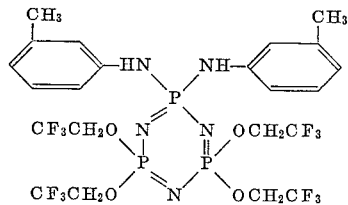

*Analysis.*—Calcd. for $C_{22}H_{24}F_{12}N_5O_4P_3$: C, 35.55; H, 3.25; N, 9.42; P, 12.50. Found: C, 35.75; H, 3.25; N, 9.49; P, 12.10.

The solid compounds of this invention can be dissolved in a suitable solvent, such as petroleum ether, and used for impregnating fabrics to make them flame resistant, and they also can be used in matches as afterglow reducing agents. In addition, the solid phosphonitrile compounds can be utilized as components in high temperature resistant greases, waxes, and lubricants.

What is claimed is:

1. A cyclic polymeric substituted-phosphonitrile of the formula:

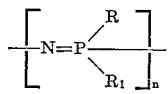

wherein $n$ is an integer of from 3 to 7, and wherein the R and $R_1$ substituents of each unit of the formula:

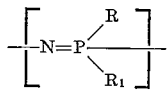

are independently selected from the group consisting of (A):

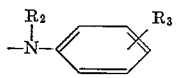

wherein $R_2$ is selected from the group consisting of hydrogen and alkyl of from 1 to about 5 carbon atoms, wherein $R_3$ is selected from the group consisting of hydrogen, alkyl of from 1 to about 5 carbon atoms and a halogen selected from the group consisting of chlorine, fluorine and bromine and (B):

wherein Z is selected from the group consisting of hydrogen and fluorine, $y$ is an integer of from 1 to 20, and with the proviso that in the said polymeric phosphonitrile at least one of the R and $R_1$ substituents is A and at least one of the R and $R_1$ substituents is B.

2. The phosphonitrile of claim 1 wherein $n$ is 3.
3. The phosphonitrile of claim 1 wherein $n$ is 4.
4. The phosphonitrile of claim 1 wherein $n$ is 4, A is

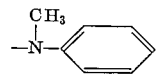

and B is —O—$CH_2$—$CF_3$.

5. The phosphonitrile of claim 1 wherein $n$ is 3, A is

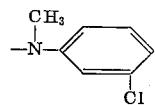

and B is —O—$CH_2$—$CF_3$.

6. The phosphonitrile of claim 1 wherein $n$ is 3, A is

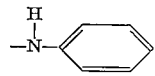

and B is —O—$CH_2$—$(CF_2)_4H$.

7. The phosphonitrile of claim 1 wherein $n$ is 3, A is

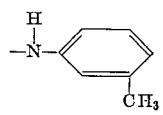

and B is —O—$CH_2$—$CF_3$.

8. A compound of the formula:

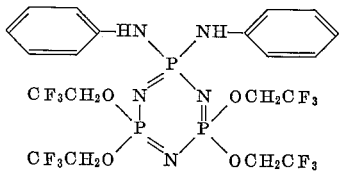

9. A compound of the formula:

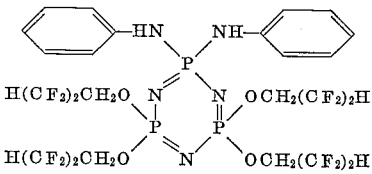

10. A compound of the formula:

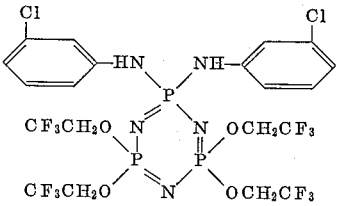

11. A compound of the formula:

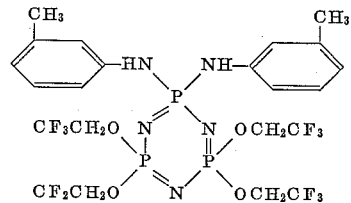

12. A compound of the formula:

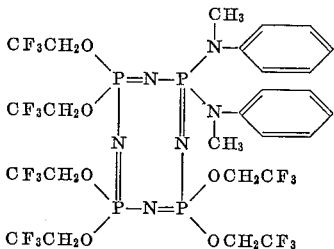

13. A compound of the formula:

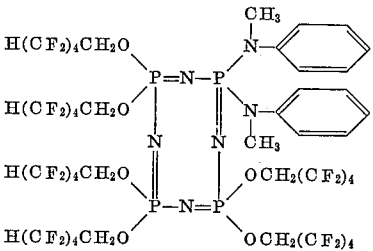

No references cited.

CHARLES B. PARKER, *Primary Examiner.*

FRANK M. SIKORA, *Assistant Examiner.*

UNITED STATES PATENT OFFICE
CERTIFICATE OF CORRECTION

Patent No. 3,280,223            October 18, 1966

Ehrenfried H. Kober et al.

It is hereby certified that error appears in the above numbered patent requiring correction and that the said Letters Patent should read as corrected below.

Column 6, line 36, for "Trimetric" read -- Trimeric --; line 41, for "N-methylanilines" read -- N-methylaniline --; line 54, for "$n_D 1.3856$" read -- $n_D^{25}$ 1.3856 --; column 9, lines 45 and 46, for "(1) B.P.=172-201° C./0.2-0.9 mm.; yield=19.8 per mostly liquid." read -- (4) B.P.=157-167° C./1.5-12.0 mm.;= 10.1 per cent, mostly liquid. --; column 11, line 29, for "(B.P. 65-100°)" read -- (B.P. 65-110°) --; line 51, for "30.0" read -- 30.0 g. --; column 12, lines 52 to 60, the formula should read as shown below instead of as in the patent:

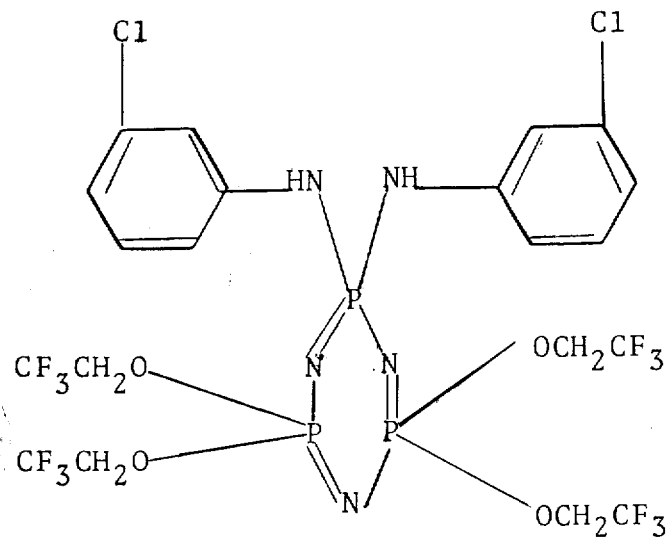

column 14, lines 34 to 44, the formula should read as shown below instead of as in the patent:

3,280,223

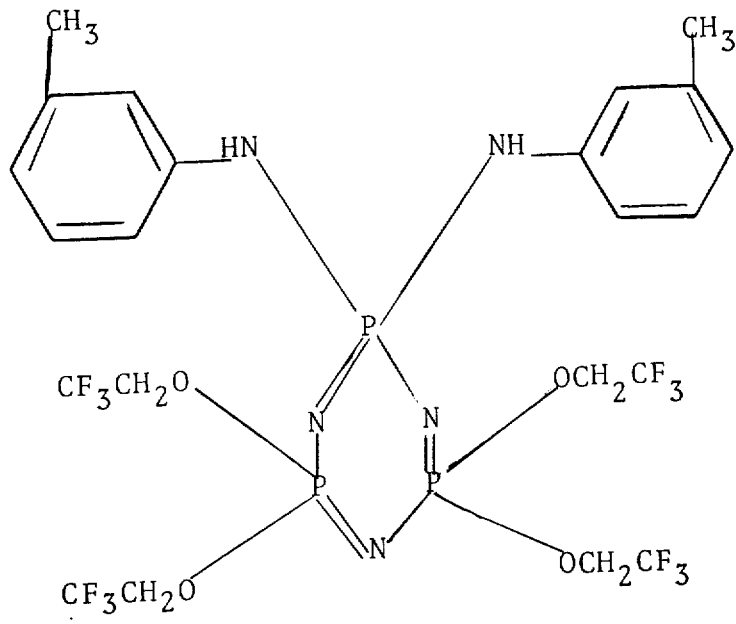

Signed and sealed this 22nd day of August 1967.

(SEAL)
Attest:

ERNEST W. SWIDER
Attesting Officer

EDWARD J. BRENNER
Commissioner of Patents